(12) United States Patent
Yamasaki et al.

(10) Patent No.: US 9,692,222 B2
(45) Date of Patent: Jun. 27, 2017

(54) HEAT-RECOVERABLE ARTICLE, WIRE SPLICE, AND WIRE HARNESS

(71) Applicants: SUMITOMO ELECTRIC INDUSTRIES, LTD., Osaka-shi, Osaka (JP); SUMITOMO ELECTRIC FINE POLYMER, INC., Sennan-gun, Osaka (JP)

(72) Inventors: Satoshi Yamasaki, Osaka (JP); Ryota Fukumoto, Osaka (JP); Yasutaka Emoto, Sennan-gun (JP)

(73) Assignees: SUMITOMO ELECTRIC INDUSTRIES, LTD., Osaka-shi, Osaka (JP); SUMITOMO ELECTRIC FINE POLYMER, INC., Sennan-gun, Osaka (JP)

(*) Notice: Subject to any disclaimer, the term of this patent is extended or adjusted under 35 U.S.C. 154(b) by 0 days.

(21) Appl. No.: 14/765,647

(22) PCT Filed: Oct. 7, 2014

(86) PCT No.: PCT/JP2014/076758
§ 371 (c)(1),
(2) Date: Aug. 4, 2015

(87) PCT Pub. No.: WO2015/068512
PCT Pub. Date: May 14, 2015

(65) Prior Publication Data
US 2016/0190787 A1  Jun. 30, 2016

(30) Foreign Application Priority Data
Nov. 6, 2013  (JP) ................................. 2013-230488

(51) Int. Cl.
*H02G 15/18* (2006.01)
*B32B 27/32* (2006.01)
(Continued)

(52) U.S. Cl.
CPC ....... *H02G 15/182* (2013.01); *B29C 61/0616* (2013.01); *B32B 1/08* (2013.01);
(Continued)

(58) Field of Classification Search
USPC ........................................................ 428/34.9
See application file for complete search history.

(56) References Cited

U.S. PATENT DOCUMENTS 4,206,786 A * 6/1980 Wetmore .............. B29C 61/065
138/137
5,271,975 A * 12/1993 Solano ................... B29C 53/083
174/74 A
(Continued)

FOREIGN PATENT DOCUMENTS

JP  H06-176649 A  6/1994
JP  2000-119403 A  4/2000
(Continued)

OTHER PUBLICATIONS

Puig et al., "Thermal characterization of the HDPE/LDPE blend (10/90) irradiated using γ-rays," Nuclear Instruments and Methods in Physics Research B, vol. 268, pp. 1466-1473, Jan. 18, 2010.
(Continued)

*Primary Examiner* — William H Mayo, III
*Assistant Examiner* — Krystal Robinson
(74) *Attorney, Agent, or Firm* — Drinker Biddle & Reath LLP

(57) ABSTRACT

It is an object of the present invention to provide a heat-recoverable article which heat-shrinks in an appropriate temperature range, in which the occurrence of bloom and bleeding is small, and which has excellent resistance to copper-induced damage; and a wire splice and a wire harness each including the heat-recoverable article. A heat-recoverable article according to the present invention has a
(Continued)

cylindrical shape and includes a base material layer, in which the base material layer contains an antioxidant and two or more polyolefin resins, the base material layer has one melting-point peak temperature, the melting-point peak temperature is 112° C. to 128° C., the heat of fusion of all of the resin components of the base material layer is 80 to 130 J/g, and the oxidation induction temperature of the base material layer is 265° C. to 280° C.

7 Claims, 3 Drawing Sheets

(51) Int. Cl.
| | | |
|---|---|---|
| *B32B 1/08* | (2006.01) | |
| *C08J 5/00* | (2006.01) | |
| *C08L 23/02* | (2006.01) | |
| *C08L 23/08* | (2006.01) | |
| *C08L 23/16* | (2006.01) | |
| *H01B 3/28* | (2006.01) | |
| *H01B 3/30* | (2006.01) | |
| *H01B 3/44* | (2006.01) | |
| *B29C 61/06* | (2006.01) | |
| *H02G 3/04* | (2006.01) | |
| *C08L 23/04* | (2006.01) | |

(52) U.S. Cl.
CPC ............ *B32B 27/32* (2013.01); *C08J 5/00* (2013.01); *C08L 23/02* (2013.01); *C08L 23/04* (2013.01); *C08L 23/08* (2013.01); *C08L 23/0815* (2013.01); *C08L 23/16* (2013.01); *H01B 3/28* (2013.01); *H01B 3/30* (2013.01); *H01B 3/44* (2013.01); *H01B 3/441* (2013.01); *H02G 3/0406* (2013.01); *H02G 3/0462* (2013.01); *H02G 15/1806* (2013.01); *C08L 2203/202* (2013.01); *C08L 2205/025* (2013.01); *C08L 2207/062* (2013.01); *C08L 2207/066* (2013.01)

(56) References Cited

U.S. PATENT DOCUMENTS

| | | | |
|---|---|---|---|
| 5,406,871 A * | 4/1995 | Lambert, Jr. | ......... B29C 61/065 |
| | | | 138/103 |
| 2005/0031811 A1* | 2/2005 | Mehan | ................. B29C 44/348 |
| | | | 428/34.9 |
| 2006/0211819 A1 | 9/2006 | Hoenig et al. | |

FOREIGN PATENT DOCUMENTS

| | | |
|---|---|---|
| JP | 2000-129042 A | 5/2000 |
| JP | 2002-012731 A | 1/2002 |
| JP | 2002-292737 A | 10/2002 |
| JP | 2002-348417 A | 12/2002 |
| JP | 2003-026818 A | 1/2003 |
| JP | 2010-185056 A | 8/2010 |
| JP | 2014-069522 A | 4/2014 |
| WO | WO-2014/097694 A1 | 6/2014 |

OTHER PUBLICATIONS

Extended European Search Report issued Mar. 20, 2017 in European Patent Application No. 14860713.8.

* cited by examiner

HEAT-RECOVERABLE ARTICLE, WIRE SPLICE, AND WIRE HARNESS

TECHNICAL FIELD

The present invention relates to a heat-recoverable article, a wire splice, and a wire harness.

BACKGROUND ART

Heat-recoverable articles such as heat-shrinkable tubes are used as covering for joints between insulated electrical wires, wire terminals, metal pipes, and the like for the purpose of protection, insulation, waterproofing, corrosion protection, and the like. For example, when a joint between insulated electrical wires is covered with a heat-shrinkable tube and heating is performed, the heat-shrinkable tube shrinks, conforms to the shape of the joint, and adheres thereto, and thus the joint can be protected. In the heat-recoverable articles, it is required that heat shrinkage does not occur at ambient temperature before being heated, and that the heat shrinkage temperature is not excessively high so that there is no concern that an object to be protected may be adversely affected during heat shrinkage.

Examples of such heat-recoverable articles include a heat-recoverable article provided with a base material layer containing a polyolefin or the like. However, in the case where a copper material such as an electrical wire is covered with such a heat-recoverable article, the heat-recoverable article becomes degraded because of copper-induced damage in which copper promotes oxidation of the base material layer. Accordingly, in an existing technique, degradation of a heat-recoverable article is prevented by incorporating a copper inhibitor or an antioxidant into a base material layer of the heat-recoverable article.

Furthermore, in order to prevent copper-induced damage, a heat-recoverable article has been proposed which includes a base material layer obtained by incorporating a six-component stabilizer into a polyolefin (refer to Japanese Unexamined Patent Application Publication No. 6-176649).

CITATION LIST

Patent Literature

PTL 1: Japanese Unexamined Patent Application Publication No. 6-176649

SUMMARY OF INVENTION

Technical Problem

However, when a copper inhibitor is incorporated into a base material layer as in the existing technique, production costs increase because the copper inhibitor is expensive. Furthermore, when a large amount of an antioxidant is incorporated into a base material layer so that oxidation of the base material layer can be prevented satisfactorily, the antioxidant migrates to the surface of the base material layer, and bloom in which the antioxidant is crystallized on the surface and bleeding in which the antioxidant, in a liquid form, oozes out to the surface may occur, resulting in poor appearance.

Furthermore, in the heat-recoverable article described in the patent application publication described above, it is necessary to incorporate six components at a predetermined ratio into the polyolefin, which is troublesome, and the heat-recoverable article is difficult to produce, which is inconvenient.

The present invention has been achieved under these circumstances, and it is an object of the invention to provide a heat-recoverable article which heat-shrinks in an appropriate temperature range, in which the occurrence of bloom and bleeding is small, and which has excellent resistance to copper-induced damage; and a wire splice and a wire harness each including the heat-recoverable article.

Solution to Problem

In an aspect of the present invention which has been achieved in order to solve the problem described above, a heat-recoverable article having a cylindrical shape includes a base material layer, in which the base material layer contains an antioxidant and two or more polyolefin resins, the base material layer has one melting-point peak temperature, the melting-point peak temperature is 112° C. to 128° C., the heat of fusion of all of the resin components of the base material layer is 80 to 130 J/g, and the oxidation induction temperature of the base material layer is 265° C. to 280° C.

In another aspect of the present invention which has been achieved in order to solve the problem described above, a wire splice includes a plurality of wires, each including a conductor and an insulating layer provided on the outside thereof, and a tube obtained by heat-shrinking the heat-recoverable article made to adhere to a joint in which the conductors of the plurality of wires are connected to each other.

In another aspect of the present invention which has been achieved in order to solve the problem described above, a wire harness includes a plurality of wires, each including a conductor and an insulating layer provided on the outside thereof, and a tube obtained by heat-shrinking the heat-recoverable article made to adhere to the plurality of wires.

Advantageous Effects of Invention

In the heat-recoverable article, and the wire splice and the wire harness, each including the heat-recoverable article, according to the present invention, the occurrence of bloom and bleeding is small, and excellent resistance to copper-induced damage is exhibited. As a result, the lifetime of the heat-recoverable article, the wire splice, and the wire harness can be extended.

DESCRIPTION OF EMBODIMENTS

Figure 1:
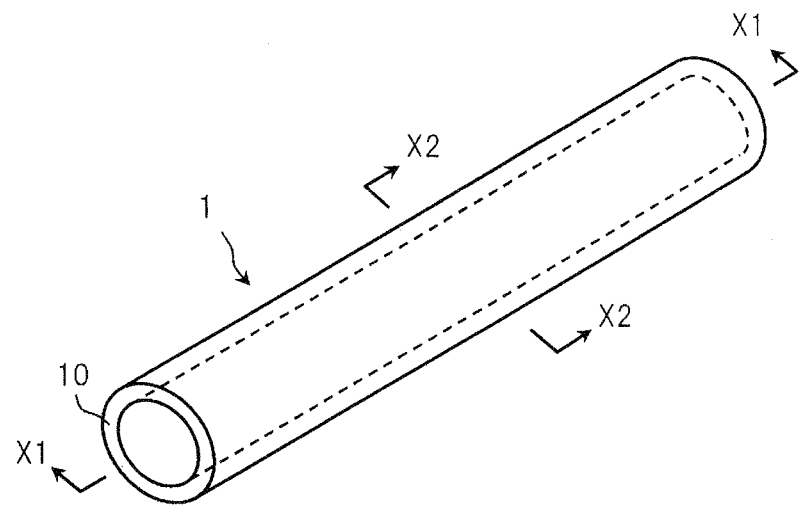
FIG. 1 is a schematic perspective view showing a heat-recoverable article according to a first embodiment of the present invention.

[Description of Embodiments of the Present Invention]

In the examination of the problem described above, the present inventors have found that, by setting the melting-point peak temperature of a base material layer in a predetermined range, a heat-recoverable article heat-shrinks in an appropriate temperature range, and by setting the base material layer so as to have one melting-point peak temperature, setting the heat of fusion of all of the resin components of the base material layer to be in a predetermined range, and setting the oxidation induction temperature of the base material layer to be in a predetermined range, the occurrence of bloom and bleeding is reduced, and the heat-recoverable article has excellent resistance to copper-induced damage.

That is, the present invention provides a heat-recoverable article having a cylindrical shape including a base material layer, in which the base material layer contains an antioxidant and two or more polyolefin resins, the base material layer has one melting-point peak temperature, the melting-point peak temperature is 112° C. to 128° C., the heat of fusion of all of the resin components of the base material layer is 80 to 130 J/g, and the oxidation induction temperature of the base material layer is 265° C. to 280° C.

In the heat-recoverable article, the base material layer has one melting-point peak temperature. In the case where the base material layer has one melting-point peak temperature, the base material layer is in a state in which two or more polyolefin resins are mixed substantially uniformly, and therefore, the antioxidant can be dispersed substantially uniformly in the polyolefin resins.

Since the antioxidant is dispersed substantially uniformly in the polyolefin resins in such a manner, bloom and bleeding are unlikely to occur. Furthermore, heat shrinkage of the heat-recoverable article occurs at a temperature close to the melting-point peak temperature of the base material layer, and since the base material layer has one melting-point peak temperature, the heat-recoverable article does not heat-shrink stepwise, but heat-shrinks at once when heated. If the heat-recoverable article heat-shrinks stepwise, there is a concern that the appearance of the heat-shrunk article may become non-homogeneous. However, since the heat-recoverable article heat-shrinks at once, the appearance of the heat-shrunk article becomes homogeneous.

Furthermore, heat shrinkage of the heat-recoverable article occurs at a temperature close to the melting-point peak temperature of the base material layer, and if the melting-point peak temperature is lower than the lower limit described above, there is a concern that there may be some difficulty in handling because the heat-recoverable article heat-shrinks at a low temperature. Furthermore, if the melting-point peak temperature is higher than the upper limit described above, there is a concern that an object to be covered with the heat-recoverable article may be adversely affected because the temperature at which the heat-recoverable article heat-shrinks increases.

However, since the melting-point peak temperature of the base material layer is within the range described above, the heat-recoverable article heat-shrinks in an appropriate temperature range. Therefore, the heat-recoverable article can be suitably used as a covering material. The term "melting-point peak temperature of the base material layer" refers to the temperature at which the amount of heat absorption per unit time reaches a maximum (peak) in the base material layer during a temperature rise when the temperature of the base material layer which has been heated at 180° C. for 2 minutes is increased from room temperature to 200° C. at 10° C./min using a differential scanning calorimeter.

In the case where the content of a crystalline polyolefin resin is high and the content of an amorphous polyolefin resin having a rubber component or an elastomer component is low in the base material layer, the heat of fusion of all of the resin components of the base material layer exceeds the upper limit described above. Since the antioxidant is dispersed and held in the amorphous polyolefin resin, as the content of the amorphous polyolefin resin increases, the antioxidant is less likely to migrate to the surface of the base material layer, bloom and bleeding are unlikely to occur, and oxidation of the base material layer is prevented. Accordingly, when the heat of fusion of all of the resin components of the base material layer exceeds the upper limit described above, the content of the crystalline polyolefin resin is high, and the content of the amorphous polyolefin resin is low in the base material layer. Therefore, bloom and bleeding are likely to occur, and there is a concern that the base material layer may be likely to become oxidized.

On the other hand, when the heat of fusion of all of the resin components of the base material layer is lower than the lower limit described above, there is a concern that the base material layer may be excessively soft because of an excessively high content of the amorphous polyolefin resin, and use as the heat-recoverable article may be impossible. The term "heat of fusion of all of the resin components of the base material layer" refers to the value (J/g) obtained by dividing the amount of heat absorption (J) of the base material layer during a temperature rise from room temperature to 200° C. by the mass (g) of all of the resin components in the base material layer when, under the assumption that heat absorption of the base material layer is totally caused by the polyolefin resins and other resin components contained in the base material layer, the melting-point peak temperature is measured.

Furthermore, the content of the antioxidant in the base material layer and the oxidation induction temperature of the base material layer have a relationship that when the content of the antioxidant in the base material layer is increased, the oxidation induction temperature of the base material layer increases. Therefore, when the oxidation induction temperature of the base material layer is lower than the lower limit described above, there is a concern that the content of the antioxidant in the base material layer may be excessively low, and the base material layer may be likely to become oxidized. Furthermore, when the oxidation induction temperature of the base material layer exceeds the upper limit described above, because of a high content of the antioxidant, there is a concern that bloom and bleed may occur. The term "oxidation induction temperature" refers to the temperature at which the temperature increase due to heat generation reaches a maximum (peak) when the temperature of a material to be measured is raised from 150° C. at 2° C./min, using a differential scanning calorimeter, in an oxygen atmosphere.

Among the polyolefin resins, preferably, at least one polyolefin resin has a melting-point peak temperature of 112° C. or higher, and at least one other polyolefin resin has a melting-point peak temperature of lower than 112° C. or does not have a melting-point peak temperature. By setting the polyolefin resin structure as described above, it is possible to easily and reliably adjust the melting-point peak temperature of the base material layer and the heat of fusion of all of the resin components of the base material layer to be in the ranges described above.

Preferably, the one other polyolefin resin is an ethylene-propylene copolymer elastomer, an ethylene-propylene rubber, or a polyethylene-based elastomer obtained by copolymerizing at least one of butene, hexene, and octene with ethylene. This makes it possible to easily and reliably adjust the melting-point peak temperature of the base material layer and the heat of fusion of all of the resin components of the base material layer to be in the ranges described above.

The base material layer preferably contains a flame retardant, and in this case, the heat of fusion of the base material layer is preferably 60 to 85 J/g. When the amounts of a flame retardant, an inorganic filler, and the like contained in the base material layer are large, the heat of fusion of the base material layer decreases. Accordingly, when the heat of fusion of the base material layer is less than the lower limit described above, the amounts of a flame retardant, an inorganic filler, and the like contained in the base material layer may possibly be excessively large, resulting in reduced elongation, increased tearability, or the like. Furthermore, when the heat of fusion of the base material layer exceeds the upper limit described above, there is a concern that the flame retardance, toughness, or elongation required as the heat-recoverable article may be degraded. The term "heat of fusion of the base material layer" refers to the value (J/g) obtained by dividing the amount of heat absorption (J) of the base material layer during a temperature rise from room temperature to 200° C. by the mass (g) of the base material layer when the melting-point peak temperature is measured.

The heat-recoverable article may be provided with an adhesive layer disposed on an inner peripheral surface of the base material layer. By providing an adhesive layer, adhesion of the base material layer to a portion to be covered with the heat-recoverable article is enhanced, and it is possible to improve an insulating property, waterproofness, corrosion protectiveness, and the like.

Preferably, the adhesive layer contains an ethylene-vinyl acetate copolymer or a polyamide. By using such a composition, adhesion of the base material layer to a portion to be covered with the heat-recoverable article is more reliably enhanced, and it is possible to improve an insulating property, waterproofness, corrosion protectiveness, and the like.

The oxidation induction temperature of the adhesive layer is preferably 255° C. or higher. In the case where a copper material such as an electrical wire is covered with the heat-recoverable article, the present inventors have found that by incorporating an antioxidant into the adhesive layer, the heat-recoverable article is unlikely to become degraded. The reason for this is believed to be that the antioxidant in the adhesive layer prevents copper from oxidizing the adhesive layer and at the same time, the antioxidant in the adhesive layer migrates into the base material layer, thus preventing ionized copper which has migrated into the base material layer from oxidizing the base material layer and preventing oxygen around the heat-recoverable article from oxidizing the base material layer. Furthermore, the content of the antioxidant in the adhesive layer and the oxidation induction temperature of the adhesive layer have a relationship that when the content of the antioxidant in the adhesive layer is increased, the oxidation induction temperature of the adhesive layer increases. Therefore, when the oxidation induction temperature of the adhesive layer is lower than the lower limit described above, there is a concern that the content of the antioxidant in the adhesive layer may be excessively low, and the base material layer may be likely to become oxidized.

Furthermore, the present invention covers a wire splice including a plurality of wires, each including a conductor and an insulating layer provided on the outside thereof, and a tube obtained by heat-shrinking the heat-recoverable article made to adhere to a joint in which the conductors of the plurality of wires are connected to each other.

The wire splice includes a tube obtained by heat-shrinking the heat-recoverable article which has excellent resistance to copper-induced damage as described above. Therefore, the lifetime of the wire splice can be extended, and it is possible to maintain, for a long period of time, the protection state in protection, insulation, waterproofing, corrosion protection, and the like of wires and a joint therebetween.

Furthermore, the present invention covers a wire harness including a plurality of wires, each including a conductor and an insulating layer provided on the outside thereof, and a tube obtained by heat-shrinking the heat-recoverable article made to adhere to the plurality of wires.

The wire harness includes a tube obtained by heat-shrinking the heat-recoverable article which has excellent resistance to copper-induced damage as described above. Therefore, the lifetime of the wire harness can be extended, and it is possible to maintain, for a long period of time, the protection state in protection, insulation, waterproofing, corrosion protection, and the like of wires.

[Detailed Description Of Embodiments Of The Present Invention]

Examples of a heat-recoverable article, a wire splice, and a wire harness according to the present invention will be described with reference to the drawings. It is intended that the present invention is not limited to the examples, but is determined by appended claims, and includes all variations of the equivalent meanings and ranges to the claims.

[Heat-recoverable Article]

First, embodiments of a heat-recoverable article will be described below.

[First Embodiment]

Figure 2:
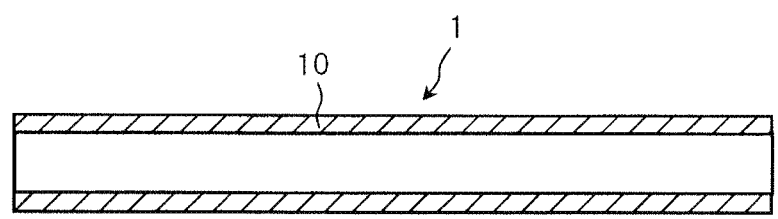
FIG. 2 is a schematic cross-sectional view taken along the line X1-X1 of FIG. 1.
Figure 3:
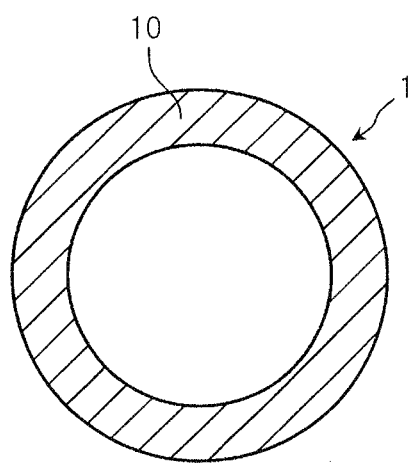
FIG. 3 is a schematic cross-sectional view taken along the line X2-X2 of FIG. 1.

A heat-recoverable article 1 shown in FIGS. 1 to 3 is used, for example, to cover a joint between insulated electrical wires, a wire terminal, a metal pipe, or the like for the purpose of protection, insulation, waterproofing, corrosion protection, or the like. The heat-recoverable article 1 includes a cylindrical base material layer 10.

<Base Material Layer>

The base material layer 10 contains an antioxidant and, as a main component, two or more polyolefin resins. The term "main component" refers to a component whose content is highest and, for example, refers to a component whose content is 50% by mass or more. The base material layer 10 is formed as a tube which reduces in diameter when heated.

Furthermore, preferably, a flame retardant is added into the base material layer 10 for the purpose of improving flame retardance. Moreover, other additives may be added into the base material layer 10 as necessary. Examples of such additives include a copper inhibitor, a lubricant, a coloring agent, a heat stabilizer, and an ultraviolet absorber.

<Melting-Point Peak Temperature of Base Material Layer>

The base material layer 10 has one melting-point peak temperature. In the case where the base material layer 10 has one melting-point peak temperature, the base material layer 10 is in a state in which two or more polyolefin resins are mixed substantially uniformly, and therefore, the antioxidant can be dispersed substantially uniformly in the polyolefin resins. Since the antioxidant is dispersed substantially uniformly in the polyolefin resins in such a manner, bloom and bleeding are unlikely to occur. Furthermore, heat shrinkage of the heat-recoverable article occurs at a temperature close to the melting-point peak temperature of the base material layer, and since the base material layer has one melting-point peak temperature, the heat-recoverable article does not heat-shrink stepwise, but heat-shrinks at once when heated. If the heat-recoverable article heat-shrinks stepwise, there is a concern that the appearance of the heat-shrunk article may become non-homogeneous. However, since the heat-recoverable article heat-shrinks at once, the appearance of the heat-shrunk article becomes homogeneous.

The lower limit of the melting-point peak temperature of the base material layer 10 is 112° C., and preferably 115° C. Furthermore, the upper limit of the melting-point peak temperature of the base material layer 10 is 128° C., and preferably 123° C. If the melting-point peak temperature is lower than the lower limit described above, there is a concern that there may be some difficulty in handling because the heat-recoverable article 1 heat-shrinks at a low temperature. Furthermore, if the melting-point peak temperature is higher than the upper limit described above, there is a concern that an object to be covered with the heat-recoverable article may be adversely affected because the temperature at which the heat-recoverable article 1 heat-shrinks increases.

The lower limit of the heat of fusion of all of the resin components of the base material layer 10 is 80 J/g, and preferably 90 J/g. Furthermore, the upper limit of the heat of fusion of all of the resin components of the base material layer 10 is 130 J/g, and preferably 125 J/g.

In the case where the content of a crystalline polyolefin resin is high and the content of an amorphous polyolefin resin having a rubber component or an elastomer component is low in the base material layer 10, the heat of fusion of all of the resin components of the base material layer exceeds the upper limit described above. Since the antioxidant is dispersed and held in the amorphous polyolefin resin, as the content of the amorphous polyolefin resin increases, bloom and bleeding are unlikely to occur, and oxidation of the base material layer 10 is prevented. Accordingly, when the heat of fusion of all of the resin components of the base material layer 10 exceeds the upper limit described above, the content of the crystalline polyolefin resin is high, and the content of the amorphous polyolefin resin is low in the base material layer 10. Therefore, bloom and bleeding are likely to occur, and there is a concern that the base material layer 10 may be likely to become oxidized. Furthermore, the melting-point peak temperature of the base material layer 10 increases, and there is a concern that the temperature at which heat shrinkage occurs may increase.

On the other hand, when the heat of fusion of all of the resin components of the base material layer 10 is lower than the lower limit described above, there is a concern that the base material layer 10 may be excessively soft because of an excessively high content of the amorphous polyolefin resin, and use as the heat-recoverable article 1 may be impossible. Furthermore, the melting-point peak temperature of the base material layer 10 decreases, and there is a concern that shrinkage may occur at a low temperature.

<Oxidation Induction Temperature of Base Material Layer>

The lower limit of the oxidation induction temperature of the base material layer 10 is 265° C., and preferably 270° C. The upper limit of the oxidation induction temperature of the base material layer 10 is 280° C., and preferably 275° C.

When the oxidation induction temperature is lower than the lower limit, the base material layer 10 is likely to become oxidized, and there is a concern that the heat-recoverable article may be degraded. When the oxidation induction temperature is higher than the upper limit, because of the large content of the antioxidant, there is a concern that bloom and bleeding may occur.

(Polyolefin Resin)

Examples of the polyolefin resin include a polyethylene, a polypropylene, an ethylene-α-olefin copolymer, an ethylene-vinyl ester copolymer, an ethylene-α,β-unsaturated carboxylic alkyl ester copolymer, an olefinic thermoplastic elastomer, and an olefinic rubber.

The lower limit of the melt flow rate (MFR) of the polyolefin resin is preferably 0.1 g/10 min, and more preferably 0.4 g/10 min. When the MFR is less than the lower limit, a large pressure is needed to form the base material layer 10 by extrusion. On the other hand, the upper limit of the MFR of the polyolefin resin is preferably 10 g/10 min, and more preferably 4 g/10 min. When the MFR is more than the upper limit, the resin flows excessively, which makes it difficult to obtain a uniform shape of the base material layer. Note that the MFR refers to the value measured, using an extrusion plastometer stipulated in JIS-K6760:1997, under the conditions at a temperature of 190° C. and a load of 21.6 kg in accordance with JIS-K7210: 1997.

Examples of the polyethylene include a low-density polyethylene obtained by a high pressure radical polymerization method, an ultralow-density polyethylene, a linear low-density polyethylene, a high-density polyethylene, and a metallocene polymerized polyethylene.

Examples of the polypropylene include a homo polypropylene, a block polypropylene, and a random polypropylene.

Examples of the α-olefin of the ethylene-α-olefin copolymer include an α-olefin having about 3 to 20 carbon atoms. More specifically, examples of the α-olefin include propylene, 1-butene, 1-hexene, 1-heptene, 1-octene, 1-nonene, 1-decene, 1-undecene, l-dodecene, 1-tridecene, 1-tetradecene, 1-pentadecene, 1-hexadecene, 1-heptadecene, 1-nonadecene, 1-eicosene, 9-methyl-1-decene, 11-methyl-1-dodecene, and 12-ethyl-1-tetradecene.

Examples of the vinyl ester of the ethylene-vinyl ester copolymer include vinyl propionate, vinyl acetate, vinyl caproate, vinyl caprylate, vinyl laurate, vinyl stearate, and vinyl trifluoroacetate.

Examples of the α,β-unsaturated carboxylic alkyl ester of the ethylene-α,β-unsaturated carboxylic alkyl ester copolymer include methyl acrylate, methyl methacrylate, ethyl acrylate, and ethyl methacrylate.

Examples of the olefinic thermoplastic elastomer include a low-density polyethylene elastomer, an ultralow-density polyethylene elastomer, and a polypropylene elastomer.

Examples of the olefinic rubber include an ethylene propylene rubber, a butadiene rubber, and an isoprene rubber.

Examples of the ethylene propylene rubber include a random copolymer containing, as main components, ethylene and propylene; and a random copolymer containing, as main components, in addition to ethylene and propylene, a diene monomer, such as dicyclopentadiene or ethylidene norbornene, as a third component.

Examples of the butadiene rubber include a styrene-butadiene block copolymer and a hydrogenated or partially hydrogenated derivative thereof such as a styrene-ethylene-butadiene-styrene copolymer, 1,2-polybutadiene, a maleic anhydride-modified styrene-ethylene-butadiene-styrene copolymer, and a modified butadiene rubber having a core-shell structure.

Examples of the isoprene rubber include a styrene-isoprene block copolymer and a hydrogenated or partially hydrogenated derivative thereof such as a styrene-ethylene-isoprene-styrene copolymer, a maleic anhydride-modified styrene-ethylene-isoprene-styrene copolymer, and a modified isoprene rubber having a core-shell structure.

<Antioxidant>

As the antioxidant, a phenol-based antioxidant or an amine-based antioxidant is preferable. By using any of these antioxidants, it is possible to improve resistance to copper-induced damage. Furthermore, as the antioxidant, in addition to the antioxidant described above, a sulfur-based antioxidant, a phosphite ester-based antioxidant, and the like can be used alone or in combination.

Furthermore, the lower limit of the content of the antioxidant in the base material layer 10 is preferably 1 part by mass, and more preferably 1.5 parts by mass, relative to 100 parts by mass of the polyolefin resin. On the other hand, the upper limit of the content of the antioxidant is preferably 5 parts by mass, and more preferably 3 parts by mass, relative to 100 parts by mass of the polyolefin resin. When the content of the antioxidant is less than the lower limit, the base material layer 10 is likely to become oxidized, and there is a concern that the heat-recoverable article 1 may be degraded. Furthermore, when the content of the antioxidant is more than the upper limit, the antioxidant migrates to the surface of the base material layer 10, and bloom in which the antioxidant is crystallized on the surface and bleeding in which the antioxidant, in a liquid form, oozes out to the surface may occur, resulting in poor appearance.

(Phenol-Based Antioxidant)

Examples of the phenol-based antioxidant include pentaerythritol tetrakis[3-(3,5-di-tert-butyl-4-hydroxyphenyl) propionate], tetrakis-[methylene-3-(3'5'-di-tert-butyl-4'-hydroxyphenyl)propionate]methane, triethylene glycol-bis[3-(3-tert-butyl-5-methyl-4-hydroxyphenyl)propionate], and 6-(4-hydroxy-3,5-di-tert-butyl-anilino)-2,4-bis-octyl-thio-1,3,5-triazine.

(Amine-Based Antioxidant)

Examples of the amine-based antioxidant include 4,4'(α,α-dimethylbenzyl)diphenylamine, polymers of 2,2,4-trimethyl-1,2-dihydroquinoline, 6-ethoxy-2,2,4-trimethyl-1,2-dihydroquinoline, N-(1,3-dimethylbutyl)-N'-phenyl-1,4-phenylenediamine, and N-isopropyl-N'-phenyl-1,4-phenylenediamine.

Furthermore, among the polyolefin resins, the lower limit of the melting-point peak temperature of at least one polyolefin resin is preferably 112° C. or higher, and more preferably 115° C. or higher. In this case, the upper limit of the melting-point peak temperature of at least one other polyolefin resin is preferably lower than 112° C., and more preferably lower than 110° C. Alternatively, preferably, the one other polyolefin resin does not have a melting-point peak temperature. By setting the polyolefin resin structure as described above, it is possible to easily and reliably adjust the melting-point peak temperature of the base material layer 10 and the heat of fusion of all of the resin components of the base material layer to be in the ranges described above.

Preferably, the one other polyolefin resin is an ethylene-propylene copolymer elastomer, an ethylene-propylene rubber, or a polyethylene-based elastomer obtained by copolymerizing at least one of butene, hexene, and octene with ethylene. This makes it possible to easily and reliably adjust the melting-point peak temperature of the base material layer 10 and the heat of fusion of all of the resin components of the base material layer to be in the ranges described above.

(Flame Retardant)

Examples of the flame retardant include chlorine-based flame retardants, such as chlorinated paraffin, chlorinated polyethylene, chlorinated polyphenyl, and perchloropentacyclodecane; bromine-based flame retardants, such as 1,2-bis(2,3,4,5,6-pentabromophenyl)ethane, ethylenebispentabromobenzene, ethylenebispentabromodi phenyl, tetrabromoethane, tetrabromobisphenol A, hexabromobenzene, decabromobiphenyl ether, tetrabromophthalic anhydride, polydibromophenylene oxide, hexabromocyclodecane, and ammonium bromide; phosphate esters or phosphorus compounds, such as triallyl phosphate, alkyl aryl phosphate, alkyl phosphate, dimethyl phosphonate, phosphorinate, halogenated phosphorinate ester, trimethyl phosphate, tributyl phosphate, trioctyl phosphate, tributoxyethyl phosphate, octyldiphenyl phosphate, tricresyl phosphate, cresylphenyl phosphate, triphenyl phosphate, tris (chloroethyl) phosphate, tris(2-chloropropyl) phosphate, tris (2,3-dichloropropyl) phosphate, tris(2,3-dibromopropyl) phosphate, tris(bromochloropropyl) phosphate, bis(2,3-dibromopropyl)2,3-dichloropropyl phosphate, bis(chloropropyl)monooctyl phosphate, polyphosphonate, polyphosphate, aromatic polyphosphate, dibromoneopentyl glycol, and aluminum tris(diethylphosphinate); polyols, such as phosphonate-type polyols, phosphate-type polyols, and halogen-containing polyols; metal powders or inorganic compounds, such as aluminum hydroxide, magnesium hydroxide, magnesium carbonate, antimony trioxide, antimony trichloride, zinc borate, antimony borate, boric acid, antimony molybdate, molybdenum oxide, phosphorus-nitrogen compounds, calcium-aluminum silicate, zirconium compounds, tin compounds, dawsonite, calcium aluminate hydrate, copper oxide, metallic copper powder, calcium carbonate, and barium metaborate; nitrogen compounds, such as melamine cyanurate, triazine, isocyanurate, urea, and guanidine; and other compounds, such as silicone polymers, ferrocene, fumaric acid, and maleic acid. Among these, halogen-based flame retardants, such as bromine-based flame retardants and chlorine-based flame retardants, are preferable. Bromine-based flame retardants and chlorine-based flame retardants may be used alone or in combination of two or more.

The lower limit of the content of the bromine-based flame retardant is preferably 1 part by mass, and more preferably 5 parts by mass, relative to 100 parts by mass of the polyolefin resin. The upper limit of the bromine-based flame retardant is preferably 50 parts by mass, and more preferably 40 parts by mass, relative to 100 parts by mass of the polyolefin resin. The lower limit of total flame retardant content is preferably 1 part by mass, and more preferably 5 parts by mass, relative to 100 parts by mass of the polyolefin resin. The upper limit of total flame retardant content is preferably 100 parts by mass, and more preferably 80 parts by mass, relative to 100 parts by mass of the polyolefin resin. When the content of the bromine-based flame retardant or the total flame retardant content is less than the lower limit, there is a concern that the effect of imparting flame retardance may not be obtained. Furthermore, when the content of the bromine-based flame retardant or the total flame retardant content is more than the upper limit, there is a concern that the toughness and elongation required for the heat-recoverable article may be degraded.

In the case where the base material layer 10 contains a flame retardant, the lower limit of the heat of fusion of the base material layer 10 is preferably 60 J/g, and more preferably 65 J/g. Furthermore, the upper limit of the heat of fusion of the base material layer 10 is preferably 85 J/g, and more preferably 80 J/g. When the amounts of the flame retardant, an inorganic filler, and the like contained in the base material layer 10 are large, the heat of fusion of the base material layer 10 decreases. Accordingly, when the heat of fusion of the base material layer 10 is less than the lower limit described above, the amounts of the flame retardant, an inorganic filler, and the like may possibly be excessively large, resulting in reduced elongation, increased tearability, or the like. On the other hand, when the heat of fusion exceeds the upper limit described above, there is a concern that the flame retardance, toughness, or elongation required as the heat-recoverable article may be degraded.

(Copper Inhibitor)

Examples of the copper inhibitor include 3-(N-salicyloyl)amino-1,2,4-triazole, decamethylene dicarboxylic acid disalicyloyl hydrazide, and 2,3-bis[3-(3,5-di-tert-butyl-4-hydroxyphenyl)propionyl]propionohydrazide. By incorporating a copper inhibitor into the base material layer 10, copper-induced damage prevention is anticipated.

Regarding the range of the content of the copper inhibitor, for example, in the case where the copper inhibitor is 3-(N-salicyloyl)amino-1,2,4-triazole, the lower limit is preferably 0.5 parts by mass, and more preferably 1 part by mass, relative to 100 parts by mass of the polyolefin resin. The upper limit is preferably 10 parts by mass, and more preferably 5 parts by mass, relative to 100 parts by mass of the polyolefin resin. When the content of the copper inhibitor is less than the lower limit, there is a concern that the effect of the copper inhibitor may not be obtained. Furthermore, even when the content of the copper inhibitor is more than the upper limit, it is not possible to improve the effect of preventing copper-induced damage.

<Method for producing heat-recoverable article>

A heat-recoverable article 1 can be produced, for example, through the following steps:

(1) a step of preparing a base material layer resin composition for forming a base material layer 10,
(2) a step of forming an extruded article by extruding the base material layer resin composition using a melt extruder, and
(3) a step of expanding the diameter of the extruded article to produce a heat-recoverable article.

(1) Step of Preparing Composition

The base material layer resin composition can be prepared by mixing a resin component, an antioxidant, and optionally, an additive with a melt mixer. As the melt mixer, a known mixer, such as an open roll mixer, a Banbury mixer, a pressure kneader, a single screw mixer, or a multi-screw mixer, can be used.

(2) Step of Forming Extruded Article

An extruded article is formed by extruding the base material layer resin composition using a known melt extruder. In the extruded article, the material constituting the base material layer may be crosslinked to improve heat resistance. Crosslinking can be performed, for example, by a method of crosslinking using irradiation with ionizing radiation, chemical crosslinking, thermal crosslinking, or the like.

The size of the extruded article can be designed according to intended use or the like. Regarding the size of the layer corresponding to the base material layer 10 of the extruded article, for example, the inside diameter is 1.0 to 30 mm, and the thickness is 0.1 to 10 mm.

(3) Step of Expanding Diameter of Extruded Article

The expansion of the diameter of the extruded article is performed by heating the extruded article to a temperature equal to or higher than the melting point, and in that state, expanding the extruded article to a predetermined inside diameter by a method of introducing compressed air thereinto, or the like, followed by cooling to fix the shape. The expansion of the diameter of the extruded article is performed, for example, such that the extruded article is expanded to about two to four times the inside diameter. By performing expansion of the diameter of the extruded article and fixing the shape in such a manner, a heat-recoverable article is obtained.

<Advantages>

In the heat-recoverable article 1, the base material layer 10 has one melting-point peak temperature, the melting-point peak temperature and the heat of fusion of all of the resin components of the base material layer 10 are in the ranges described above, and the oxidation induction temperature of the base material layer 10 is in the range described above. Therefore, heat shrinkage occurs in an appropriate temperature range, the occurrence of bloom and bleeding is small, and excellent resistance to copper-induced damage is exhibited.

[Second Embodiment]

Figure 4:
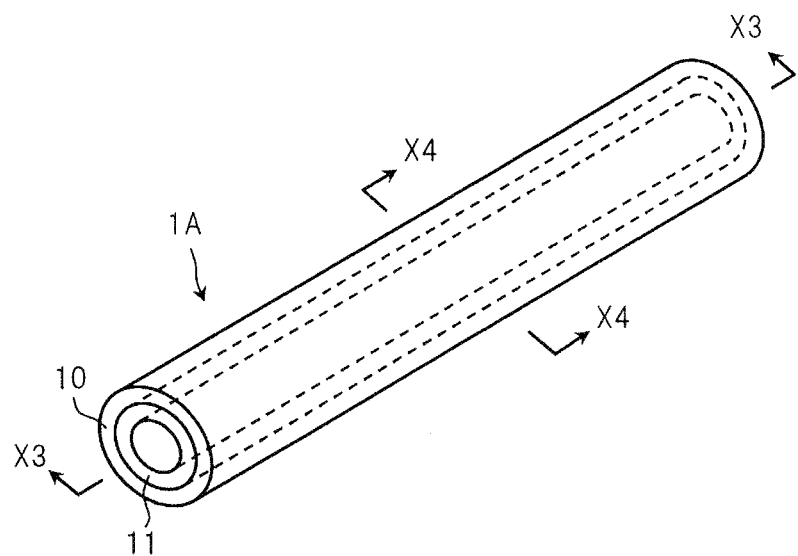
FIG. 4 is a schematic perspective view showing a heat-recoverable article according to a second embodiment of the present invention.
Figure 5:
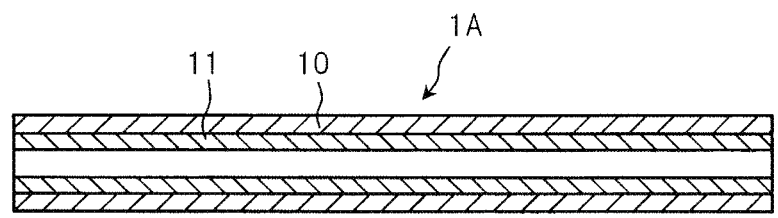
FIG. 5 is a schematic cross-sectional view taken along the line X3-X3 of FIG. 4.
Figure 6:
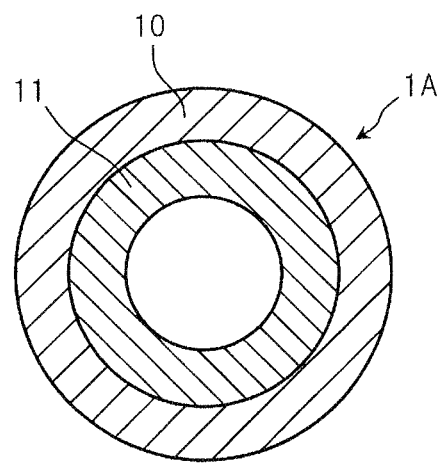
FIG. 6 is a schematic cross-sectional view taken along the line X4-X4 of FIG. 4.

FIGS. 4 to 6 show a heat-recoverable article 1A according to a second embodiment. In the heat-recoverable article 1A, the same components as those of the heat-recoverable article 1 according to the first embodiment are designated by the same reference numerals, and duplicate descriptions are omitted. The heat-recoverable article 1A according to the second embodiment is a multilayered heat-recoverable article which includes an adhesive layer 11 disposed on an inner peripheral surface of a base material layer 10.

<Adhesive Layer>

The adhesive layer 11 preferably contains an ethylene-vinyl acetate copolymer or a polyamide. The adhesive layer 11 enhances adhesion of the base material layer 10 to a portion to be covered with the heat-recoverable article 1A and improves waterproofness or the like. Furthermore, preferably, an inorganic filler is added into the adhesive layer 11 for the purpose of adjusting the viscosity after being formed into the heat-recoverable article 1A. Moreover, other additives may be added into the adhesive layer 11 as necessary. Examples of such additives include an antioxidant, a copper inhibitor, a deterioration inhibitor, a viscosity characteristics improving agent, a flame retardant, a lubricant, a coloring agent, a heat stabilizer, an ultraviolet absorber, and a gluing agent.

<Oxidation Induction Temperature of Adhesive Layer>

The lower limit of the oxidation induction temperature of the adhesive layer 11 is preferably 255° C., and more preferably 258° C. Furthermore, the upper limit of the oxidation induction temperature of the adhesive layer 11 is preferably 270° C., and more preferably 265° C. When the oxidation induction temperature is lower than the lower limit, the adhesive layer 11 and the base material layer 10 are likely to become oxidized, and there is a concern that the multilayered heat-recoverable article may be degraded. Furthermore, even when the oxidation induction temperature is higher than the upper limit, it is not possible to improve the effect of inhibiting oxidation of the adhesive layer 11 and the base material layer 10.

(Ethylene-Vinyl Acetate Copolymer)

The lower limit of the content of vinyl acetate in the ethylene-vinyl acetate copolymer is preferably 12% by mass, more preferably 15% by mass, and still more preferably 19% by mass. The upper limit of the content of vinyl acetate is preferably 46% by mass, more preferably 35% by mass, and still more preferably 30% by mass. When the content of vinyl acetate is less than the lower limit, there is a concern that sufficient flexibility may not be obtained. On the other hand, when the content of vinyl acetate is more than the upper limit, there is a concern that the adhesive composition for forming the adhesive layer 11 may stick to a die, a mold, or the like during extrusion of the adhesive layer 11, resulting in a difficulty in handling.

The lower limit of the MFR of the ethylene-vinyl acetate copolymer is preferably 50 g/10 min, and more preferably 100 g/10 min. When the MFR is less than the lower limit, a large pressure is needed to form the adhesive layer 11 by extrusion. Furthermore, the upper limit of the MFR of the ethylene-vinyl acetate copolymer is preferably 600 g/10 min, and more preferably 500 g/10 min. When the MFR is more than the upper limit, the resin flows excessively, which makes it difficult to obtain a uniform shape of the adhesive layer 11.

(Inorganic Filler)

Examples of the inorganic filler include organically treated layered silicate, organically treated swelling mica, calcium carbonate, and carbon. By incorporating the inorganic filler, the viscosity of the adhesive layer 11 can be easily adjusted, and the thickness of the adhesive layer 11 can be made uniform.

Regarding the range of the content of the inorganic filler, for example, in the case where the inorganic filler is organically treated layered silicate, the lower limit is preferably 0.5 parts by mass, and more preferably 2 parts by mass, relative to 100 parts by mass of the ethylene-vinyl acetate copolymer or the polyamide. The upper limit is preferably 40 parts by mass, and more preferably 30 parts by mass, relative to 100 parts by mass of the ethylene-vinyl acetate copolymer or the polyamide. When the content of the inorganic filler is less than the lower limit, there is a concern that the effect of the inorganic filler may not be obtained. Furthermore, when the content of the inorganic filler is more than the upper limit, there is a concern that the flexibility of the adhesive layer 11 may be degraded.

(Organically Treated Layered Silicate)

The organically treated layered silicate is obtained by organically treating a layered silicate (clay mineral, or clay), such as montmorillonite, bentonite, or smectite. Interlayer cations, such as magnesium ions, sodium ions, or calcium ions, are intercalated between adjacent planar silicate layers which are stacked in a layered manner, and a layered crystal structure is maintained. The interlayer cations are ion-exchanged with organic cations by organically treating the layered silicate. When the organic compound is chemically bound to the surfaces of planar silicate layers and introduced (intercalated) between the adjacent layers in such a manner, the interlayer distance increases between the adjacent planar silicate layers, and thus dispersibility in the thermoplastic resin is improved. As the layered silicate, either a natural material or a synthetic material can be used.

<Antioxidant>

As the antioxidant of the adhesive layer 11, the same antioxidant as that of the base material layer 10 can be used.

Furthermore, the lower limit of the content of the antioxidant in the adhesive layer 11 is preferably 4 parts by mass, and more preferably 6 parts by mass, relative to 100 parts by mass of the ethylene-vinyl acetate copolymer or the polyamide. On the other hand, the upper limit of the content of the antioxidant is preferably 14 parts by mass, and more preferably 9 parts by mass, relative to 100 parts by mass of the ethylene-vinyl acetate copolymer or the polyamide. When the content of the antioxidant is less than the lower limit, the adhesive layer 11 and the base material layer 10 are likely to become oxidized, and there is a concern that the heat-recoverable article 1A may be degraded. Furthermore, even when the content of the antioxidant is more than the upper limit, it is not possible to improve the effect of inhibiting oxidation of the adhesive layer 11 and the base material layer 10.

(Copper Inhibitor)

As the copper inhibitor, the same copper inhibitor as that of the base material layer 10 can be used. By incorporating a copper inhibitor into the adhesive layer 11, copper-induced damage prevention is anticipated.

(Deterioration Inhibitor)

The deterioration inhibitor inhibits deterioration of an adherend to which the heat-recoverable article 1A is made to adhere.

Typically, the deterioration inhibitor inhibits occurrence of cracks in the insulating layer due to basic components contained in the insulating layer of the insulated electrical wire or the adhesive layer 11 of the heat-recoverable article 1A. The deterioration inhibitor can also serve as a viscosity characteristics improving agent. The deterioration inhibitor may be selected depending on the factors that cause deterioration of the adherend. For example, in the case where deterioration of the adherend due to basic components is inhibited, a compound that inhibits dehydrochlorination reaction due to basic components, or a compound capable of capturing or neutralizing hydrogen chloride, chloride ions, or the like generated by hydrochloric acid reaction can be used. Examples of such a deterioration inhibitor include activated clay, hydrotalcite, and a phosphorus-containing antioxidant (with an acid value of 10 mgKOH/g or more). By incorporating such a deterioration inhibitor into the adhesive layer 11, for example, a nitrogen-containing compound can be adsorbed, anions can be intercalated, or hydrogen chloride generated by dehydrochlorination reaction can be captured, and thus, it is possible to inhibit deterioration of the adherend due to basic components of the adhesive layer 11.

<Method for producing heat-recoverable article>

A heat-recoverable article 1A can be produced, for example, through the following steps:

(1) a step of preparing a base material layer resin composition for forming a base material layer 10 and an adhesive composition for forming an adhesive layer 11,
(2) a step of forming a multilayered extruded article by extruding the base material layer resin composition and the adhesive composition using a melt extruder, and
(3) a step of expanding the diameter of the multilayered extruded article to produce a heat-recoverable article 1A.

(1) Step of Preparing Compositions

The base material layer resin composition can be prepared by mixing a resin component, an antioxidant, and optionally, an additive with a melt mixer. As the melt mixer, a known mixer, such as an open roll mixer, a Banbury mixer, a pressure kneader, a single screw mixer, or a multi-screw mixer, can be used.

The adhesive composition can be prepared by mixing a resin component, preferably an ethylene-vinyl acetate copolymer or a polyamide, and an additive according to need using a melt mixer. As the melt mixer, the same mixer as that used for the preparation of the base material layer resin composition can be used.

(2) Step of Forming Multilayered Extruded Article

A multilayered extruded article is formed by co-extruding the base material layer resin composition and the adhesive composition using a known melt extruder such that an inner layer corresponding the adhesive layer 11 is disposed on the inner peripheral surface of an outer layer corresponding to the base material layer 10. In the multilayered extruded article, the material constituting the outer layer may be crosslinked to improve heat resistance. Crosslinking can be performed, for example, by a method of crosslinking using irradiation with ionizing radiation, chemical crosslinking, or thermal crosslinking.

The size of the multilayered extruded article can be designed according to intended use or the like. Regarding the size of the layer corresponding to the base material layer 10 of the multilayered extruded article, for example, the inside diameter is 1.0 to 30 mm, and the thickness is 0.1 to 10 mm. Regarding the size of the layer corresponding to the adhesive layer 11 of the multilayered extruded article, for example, the inside diameter is 0.1 to 10 mm, and the thickness is 0.1 to 8.5 mm.

(3) Step of Expanding Diameter of Multilayered Extruded Article

The expansion of the diameter of the multilayered extruded article is performed by heating the multilayered extruded article to a temperature equal to or higher than the melting point, and in that state, expanding the multilayered extruded article to a predetermined inside diameter by a method of introducing compressed air thereinto, or the like, followed by cooling to fix the shape. The expansion of the diameter of the multilayered extruded article is performed, for example, such that the multilayered extruded article is expanded to about two to four times the inside diameter. By performing expansion of the diameter of the multilayered extruded article and fixing the shape in such a manner, a heat-recoverable article 1A is obtained.

<Advantages>

Since the heat-recoverable article 1A includes the adhesive layer 11, it is possible to enhance adhesion of the base material layer 10 to a portion to be covered with the heat-recoverable article 1A and to improve an insulating property, waterproofness, corrosion protectiveness, or the like. Furthermore, since the adhesive layer 11 contains the antioxidant, oxidation of the base material layer 10 can be inhibited.

[Wire Splice and Wire Harness]

The heat-recoverable article of the present invention can be used for protection, insulation, waterproofing, corrosion protection, or the like of a wire, such as a PE electrical wire or a PE cable in which an insulating layer covering a conductor is composed of polyethylene (PE), or a PVC electrical wire or a PVC cable whose insulating layer is composed of polyvinyl chloride (PVC). Specifically, the heat-recoverable article can be used for a wire splice and a wire harness.

Figure 7:
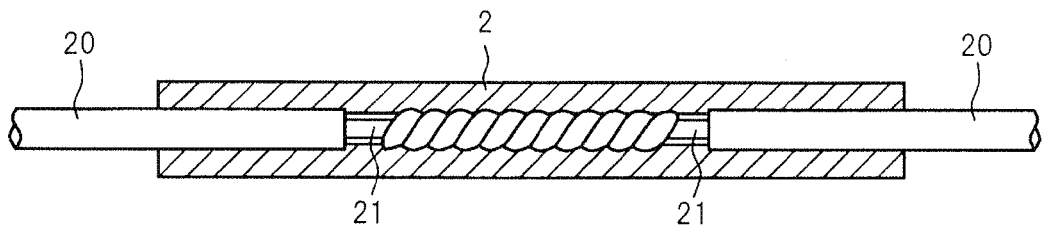
FIG. 7 is a schematic cross-sectional view, which corresponds to FIG. 2, showing a wire splice according to an embodiment of the present invention.
Figure 8:
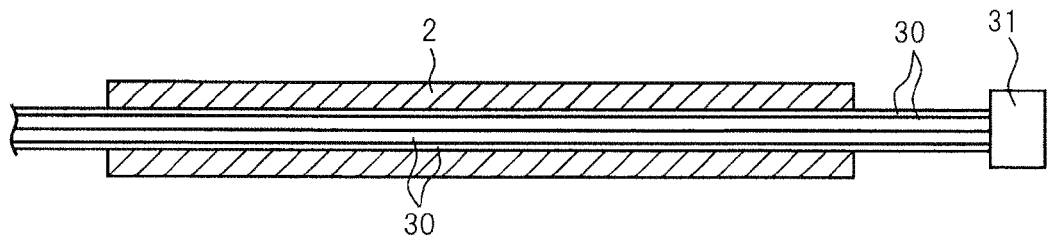
FIG. 8 is a schematic cross-sectional view, which corresponds to FIG. 2, showing a wire harness according to an embodiment of the present invention.
Figure 9:
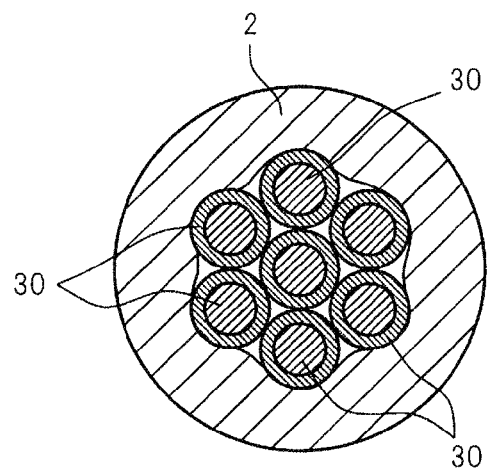
FIG. 9 is a schematic cross-sectional view, which corresponds to FIG. 3, showing the wire harness shown in FIG. 8.

FIG. 7 shows an example in which the heat-recoverable article is used in a wire splice, and FIGS. 8 and 9 show an example in which the heat-recoverable article is used in a wire harness.

In the wire splice shown in FIG. 7, conductor wires 21 of a pair of wires 20 are twisted and connected to each other, and a tube 2 obtained by heat-shrinking the heat-recoverable article 1 shown in FIG. 1 or the heat-recoverable article 1A shown in FIG. 4 is made to adhere to the joint thereof. The wire 20 is an insulated electrical wire or cable, such as a PE electrical wire or PVC electrical wire. In the wire 20 to be used, for example, an insulating layer located as an outermost layer contains, as a main component, polyvinyl chloride. The content of polyvinyl chloride in the insulating layer is, for example, 50% to 95% by mass. In such a wire splice, the tube 2 can contribute to protection, insulation, waterproofing, corrosion protection, or the like of the joint.

In the wire harness shown in FIGS. 8 and 9, a plurality of wires 30 are tied together by a tube 2 obtained by heat-shrinking the heat-recoverable article 1 shown in FIG. 1 or the heat-recoverable article 1A shown in FIG. 4, and a multi-pin connector 31 is provided on the ends of the plurality of wires 30. The wire 30 is the same as the wire 20 of the wire splice shown in FIG. 7. In the wire harness, the tube 2 not only has a function of tying the wires 30 together, but also has a function of protecting the individual wires 30 and other functions.

Note that, in some cases, the wire splice and the wire harness according to the present invention may not be strictly distinguished from each other. A wire splice may also serve as a wire harness in some cases.

<Other Embodiments>

Figure 10:
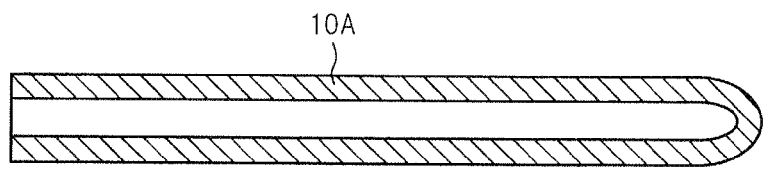
FIG. 10 is a schematic cross-sectional view, which corresponds to FIG. 2, showing a heat-recoverable article according to another embodiment of the present invention.

The heat-recoverable article of the present invention is not limited to the heat-recoverable articles shown in FIGS. 1 to 6 in which the base material layer 10 is formed in a tubular shape, but may be, for example, a heat-recoverable article shown in FIG. 10 in which a base material layer 10A is formed in a cap shape. In the heat-recoverable article, one end of the heat-recoverable article shown in FIG. 1 is subjected to heat shrinkage and closed. This heat-recoverable article can be suitably used, for example, for wire terminal treatment.

The heat-recoverable article according to the second embodiment may be formed by separately extruding the base material layer and the adhesive layer. In such a case, the adhesive layer is set inside the base material layer which has been expanded after extrusion. The resulting heat-recoverable article is used by being made to adhere to an adherend, and heat-shrinking the base material layer.

In the wire splice of the present invention, as long as the heat-recoverable article is made to adhere to a joint between wires, a wire may be connected to a plurality of wires, a plurality of wires may be connected to a plurality of wires, or ends of a plurality of wires may be connected collectively as in wire terminal treatment. Other configurations may also be used.

The wire harness of the present invention may be configured as a so-called flat harness in which a plurality of wires are tied together in a planar shape. Other configurations may also be used.

EXAMPLES

The present invention will be described more in detail on the basis of examples. However, it is to be understood that the present invention is not limited to the examples.

Examples and Comparative Examples

Heat-recoverable articles of examples and comparative examples were produced by varying the composition of the base material layer. Specifically, the heat-recoverable articles were produced through the step of forming an extruded article and the step of expanding the diameter described above, using the compositions shown in Tables I and II. In the layer corresponding to the base material layer of each extruded article, the outside diameter was set at 4.6 mm, the inside diameter was set at 2.8 mm, and the thickness was set at 0.9 mm. Subsequently, the diameter of each extruded article was expanded such that the outside diameter was 7.5 mm by the step of expanding the diameter. In such a manner, heat-recoverable articles of Nos. 1 to 7 were produced as examples, and heat-recoverable articles of Nos. 8 to 15 were produced as comparative examples.

TABLE I

| | | | Test No. 1 | 2 | 3 | 4 | 5 | 6 | 7 |
|---|---|---|---|---|---|---|---|---|---|
| Base material layer | Addition amount (parts by mass) | High-density polyethylene | 50 | 50 | 40 | — | 50 | 40 | 60 |
| | | Low-density polyethylene | — | — | — | — | — | — | — |
| | | Linear low-density polyethylene | 30 | 30 | 20 | 80 | 30 | 20 | — |
| | | Ultralow-density polyethylene elastomer | — | — | — | — | — | — | — |
| | | Ethylene-propylene rubber | 20 | 20 | 40 | 20 | 20 | 40 | 40 |
| | | Ethylene-vinyl acetate copolymer | — | — | — | — | — | — | — |
| | | Bromine-based flame retardant | 40 | 40 | 40 | 40 | — | — | 40 |
| | | Antimony trioxide | 20 | 20 | 20 | 20 | — | — | 20 |
| | | Antioxidant 1 | 4 | — | 4 | 4 | 4 | 4 | 4 |
| | | Antioxidant 2 | — | 3 | — | — | — | — | — |
| | Oxidation induction temperature (° C.) | | 268 | 265 | 270 | 269 | 267 | 269 | 268 |
| | Number of melting-point peak temperatures | | 1 | 1 | 1 | 1 | 1 | 1 | 1 |
| | Melting-point peak temperature (° C.) | | 122 | 122 | 116 | 117 | 122 | 117 | 127 |
| | Heat of fusion of base material layer (J/g) | | 76.4 | 76.8 | 60.4 | 72.7 | 117.1 | 91.6 | 78.9 |
| | Heat of fusion of all of resin components of base material layer (J/g) | | 125.2 | 125.2 | 99.1 | 119.2 | 121.8 | 95.3 | 129 |
| Test results | Transparency | | — | — | — | — | A | A | — |
| | Low-temperature shrinkability | | A | A | A | A | A | A | A |
| | Shape-keeping property | | A | A | A | A | A | A | A |
| | Flame retardance | | A | A | A | A | — | — | A |
| | Tensile elongation | | A | A | A | A | A | A | A |
| | Aging in contact with copper | Elongation evaluation | A | A | A | A | A | A | A |
| | | Elongation (%) | 300 | 350 | >400 | >400 | 280 | >400 | >400 |
| | Bloom 1 | | A | A | A | A | A | A | A |
| | Bloom 2 | | A | A | A | A | A | A | A |

TABLE II

| | | | Test No. 8 | 9 | 10 | 11 | 12 | 13 | 14 | 15 |
|---|---|---|---|---|---|---|---|---|---|---|
| Base material layer | Addition amount (parts by mass) | High-density polyethylene | — | 50 | 50 | — | 50 | 50 | 50 | 50 |
| | | Low-density polyethylene | — | — | — | — | — | — | — | — |
| | | Linear low-density polyethylene | 100 | 50 | 50 | — | — | 50 | 50 | 30 |
| | | Ultralow-density polyethylene elastomer | — | — | — | 100 | — | — | — | — |
| | | Ethylene-propylene rubber | — | — | — | — | — | — | — | 20 |
| | | Ethylene-vinyl acetate copolymer | — | — | — | — | 50 | — | — | — |
| | | Bromine-based flame retardant | 40 | 40 | 40 | 40 | 40 | — | — | — |

TABLE II-continued

| | | Test No. | | | | | | | |
|---|---|---|---|---|---|---|---|---|---|
| | | 8 | 9 | 10 | 11 | 12 | 13 | 14 | 15 |
| | Antimony trioxide | 20 | 20 | 20 | 20 | 20 | — | — | — |
| | Antioxidant 1 | 4 | 4 | 7 | 4 | 4 | 4 | 7 | 3 |
| | Antioxidant 2 | — | — | — | — | — | — | — | — |
| | Oxidation induction temperature (° C.) | 266 | 266 | 273 | 268 | 266 | 266 | 273 | 263 |
| | Number of melting-point peak temperatures | 1 | 1 | 1 | 1 | 2 | 1 | 1 | 1 |
| | Melting-point peak temperature (° C.) | 117 | 123 | 123 | 104 | 85 129 | 123 | 123 | 122 |
| | Heat of fusion of base material layer (J/g) | 92.1 | 95.1 | 95.8 | 45.8 | 114.1 | 146.3 | 141.9 | 116.9 |
| | Heat of fusion of all of resin components of base material layer (J/g) | 151.0 | 156.0 | 160.0 | 75.1 | 187.1 | 152.2 | 151.8 | 120.4 |
| Test results | Transparency | — | — | — | — | — | A | A | A |
| | Low-temperature shrinkability | A | A | A | A | B | A | A | A |
| | Shape-keeping property | A | A | A | B | B | A | A | A |
| | Flame retardance | A | A | A | A | A | — | — | — |
| | Tensile elongation | A | A | A | A | A | A | A | A |
| | Aging in contact with copper — Elongation evaluation | B | B | B | A | B | B | B | B |
| | Elongation (%) | 75 | 50 | 75 | 150 | 75 | 50 | 75 | 75 |
| | Bloom 1 | A | A | B | A | A | A | B | A |
| | Bloom 2 | B | B | B | A | B | B | B | A |

The details of the components in Tables I and II will be described below. The MFR shown below was measured, using an extrusion plastometer stipulated in JIS-K6760: 1997, under the conditions at a temperature of 190° C. and a load of 21.6 kg in accordance with JIS-K7210:1997. Furthermore, "mp" denotes the melting-point peak temperature.

High-density polyethylene: MFR 0.8 g/10 min, mp 130° C., density 0.95 g/ml

Low-density polyethylene: MFR 1.5 g/10 min, mp 108° C., density 0.92 g/ml

Linear low-density polyethylene: MFR 0.8 g/10 min, mp 120° C., density 0.92 g/ml Ultralow-density polyethylene elastomer: MFR 0.5 g/10 min, mp 55° C., density 0.87 g/ml Ethylene-propylene rubber: Mooney viscosity ($ML_{1+4}$, 125° C.) 25

Ethylene-vinyl acetate copolymer: MFR 2.5 g/10 min, vinyl acetate content 19 wt %, mp 84° C., density 0.94 g/mL Bromine-based flame retardant: 1,2-bis(2,3,4,5,6-pentabromophenyl)ethane Antimony trioxide: average particle size 1 μm Antioxidant 1: phenol-based antioxidant, pentaerythritol tetrakis[3-(3,5-di-tert-butyl-4-hydroxyphenyl)propionate]

Antioxidant 2: amine-based antioxidant, 4,4'(α,α-dimethylbenzyl)diphenylamine

<Melting-Point Peak Temperature, Heat of Fusion of Base Material Layer, and Heat of Fusion of all of Resin Components of Base Material Layer>

The melting-point peak temperature, the heat of fusion of the base material layer, and the heat of fusion of all of the resin components of the base material layer in each of the heat-recoverable articles of Nos. 1 to 15 are shown in Tables I and II. Furthermore, the measurement methods are as follows.

(Melting-Point Peak Temperature)

The temperature of a heat-recoverable article which had been heated at 180° C. for 2 minutes was increased from room temperature to 200° C. at 10° C./min using a differential scanning calorimeter ("DSC8500" manufactured by PerkinElmer Inc.), and the temperature at which the amount of heat absorption per unit time reached a maximum in the base material layer during the temperature rise was defined as the melting-point peak temperature.

(Heat of Fusion of Base Material Layer)

The value (J/g) obtained by dividing the amount of heat absorption (J) of the heat-recoverable article at the time of measuring the melting-point peak temperature by the mass (g) of the base material layer was defined as the heat of fusion of the base material layer.

(Heat of Fusion of all of Resin Components of Base Material Layer)

The value (J/g) obtained by dividing the amount of heat absorption (J) of the base material layer at the time of measuring the melting-point peak temperature by the mass (g) of all of the polyolefin resins in the base material layer was defined as the heat of fusion of all of the resin components of the base material layer.

<Oxidation Induction Temperature of Base Material Layer>

The oxidation induction temperature of the base material layer of each of the heat-recoverable articles of Nos. 1 to 15 is shown in Table I or II. The oxidation induction temperature was determined as the temperature at which the temperature increase due to heat generation reached a peak when the temperature was raised from 150° C. at 2° C./min, using a differential scanning calorimeter ("TA-60" manufactured by Shimadzu Corporation), in an oxygen atmosphere.

<Evaluation of Heat-Recoverable Article>

In order to evaluate the heat-recoverable articles of Nos. 1 to 15, transparency, low-temperature shrinkability, shape-keeping property, flame retardance, tensile elongation, aging in contact with copper, and bloom were evaluated. The evaluation results are shown in Tables I and II. The test methods for the evaluation items are as follows. Note that "-" in the tables indicates that no evaluation was made.

(Transparency)

A printed iron bar was placed into a heat-recoverable article. In the case in which the print was legible, the article was evaluated as "A", and in the case in which the print was illegible, the article was evaluated as "B". Note that, since the heat-recoverable article which contains the flame retardant is not transparent, transparency is not evaluated.

(Low-Temperature Shrinkability)

When heated at 140° C. for 5 minutes, a shrinkage recovery rate of 85% or more was evaluated as passed and indicated as "A", and a shrinkage recovery rate of less than 85% was evaluated as failed and indicated as "B". Note that the shrinkage recovery rate is the value obtained from the following formula:

Shrinkage recovery rate (%)=(outside diameter after expansion by the step of expanding the diameter−outside diameter after heat shrinkage)/(outside diameter after expansion by the step of expanding the diameter−outside diameter after extrusion)×100

(Shape-Keeping Property)

When heated at 100° C. for 5 minutes, a shrinkage recovery rate of less than 20% was evaluated as passed and indicated as "A", and a shrinkage recovery rate of 20% or more was evaluated as failed and indicated as "B".

(Flame Retardance)

A 2.8-mm-diameter copper bar was covered with a heat-recoverable article, and heating was performed at 180° C. for 2 minutes to heat-shrink the heat-recoverable article. The heat-shrunk heat-recoverable article was subjected to the VW-1 vertical flame test according to the UL standard 224. In the vertical flame test, when a flame was applied to a vertically placed heat-recoverable article for 15 seconds and this was repeated five times, in the case in which burning stopped within 60 seconds, the article was evaluated as passed and indicated as "A", and in the case in which burning did not stop within 60 seconds, the article was evaluated as failed and indicated as "B". Note that, since the heat-recoverable article which does not contain the bromine-based flame retardant and antimony trioxide is used in the application that does not require flame retardance, flame retardance is not evaluated.

(Tensile Elongation)

A sample was shrunk completely by heating at 180° C. for 2 minutes, and a tensile test was carried on the sample at a test speed of 200 mm/min. In the case in which the elongation was 100% or more, the article was evaluated as passed and indicated as "A", and in the case in which the elongation was less than 100%, the article was evaluated as failed and indicated as "B".

(Aging in Contact with Copper)

A 3.0-mm-diameter copper bar was covered with a heat-recoverable article having a two-layered structure, and heating was performed at 150° C. for 1 minute to shrink the heat-recoverable article. Then, heating was performed at 158° C. for 168 hours, and the copper bar was pulled out of the heat-recoverable article. The heat-recoverable article was subjected to a tensile test, and elongation was measured. The test speed was set at 500 mm/min. In the case in which the elongation was 100% or more, the article was evaluated as passed and indicated as "A", and in the case in which the elongation was less than 100%, the article was evaluated as failed and indicated as "B".

(Bloom 1)

In the case in which bloom and bleeding did not occur on the surface of a heat-recoverable article at the end of the expansion step, the article was evaluated as passed and indicated as "A", and in the case in which bloom or bleeding occurred on the surface, the article was evaluated as failed and indicated as "B".

(Bloom 2)

In the case in which bloom and bleeding did not occur on the surface of a heat-recoverable article after storing at room temperature for 5 months, the article was evaluated as passed and indicated as "A", and in the case in which bloom or bleeding occurred on the surface, the article was evaluated as failed and indicated as "B".

(Results)

In the heat-recoverable articles of Nos. 1 to 7, the test results in aging in contact with copper, bloom 1, and bloom 2 were all passed. On the other hand, in the heat-recoverable articles of Nos. 8 to 15, the test result was failed in either one of aging in contact with copper, bloom 1, and bloom 2.

INDUSTRIAL APPLICABILITY

In the heat-recoverable article, and the wire splice and the wire harness, each including the heat-recoverable article, according to the present invention, heat shrinkage occurs in an appropriate temperature range, the occurrence of bloom and bleeding is small, and excellent resistance to copper-induced damage is exhibited. Consequently, the present invention can be suitably used for heat-recoverable articles, wire splices, and wire harnesses for which a long lifetime is required.

REFERENCE SIGNS LIST 1, 1A heat-recoverable article
10, 10A base material layer
11 adhesive layer
2 tube
20 wire
21 conductor wire
30 wire
31 multi-pin connector

The invention claimed is:

1. A heat-recoverable article having a cylindrical shape comprising a base material layer,
   wherein the base material layer contains an antioxidant and two or more polyolefin resins;
   wherein the base material layer has one melting-point peak temperature, and the melting-point peak temperature is 112° C. to 128° C.;
   wherein the heat of fusion of all of the resin components of the base material layer is 80 to 130 J/g, and the oxidation induction temperature of the base material layer is 265° C. to 280° C.,
   wherein, among the polyolefin resins, at least one polyolefin resin has a melting-point peak temperature of 112° C. or higher, and at least one other polyolefin resin has a melting-point peak temperature of lower than 112° C. or does not have a melting-point peak temperature, and
   wherein the one other polyolefin resin is an ethylene-propylene copolymer elastomer, an ethylene-propylene rubber, or a polyethylene-based elastomer obtained by copolymerizing at least one of butene, hexene, and octene with ethylene.

2. The heat-recoverable article according to claim 1, wherein the base material layer contains a flame retardant, and the heat of fusion of the base material layer is 60 to 85 J/g.

3. The heat-recoverable article according to claim 1, further comprising an adhesive layer disposed on an inner peripheral surface of the base material layer.

4. The heat-recoverable article according to claim 3, wherein the adhesive layer contains an ethylene-vinyl acetate copolymer or a polyamide.

5. The heat-recoverable article according to claim 3, wherein the oxidation induction temperature of the adhesive layer is 255° C. or higher.

6. A wire splice comprising:
   a plurality of wires, each including a conductor and an insulating layer provided on the outside thereof; and
   a tube obtained by heat-shrinking the heat-recoverable article according to claim 1 made to adhere to a joint in which the conductors of the plurality of wites are connected to each other.

7. A wire harness comprising:
   a plurality of wires, each including a conductor and an insulating layer provided on the outside thereof; and
   a tube obtained by heat-shrinking the heat-recoverable article according to claim 1 made to adhere to the plurality of wires.

* * * * *